United States Patent [19]

Berkemeier

[11] Patent Number: 4,480,675

[45] Date of Patent: Nov. 6, 1984

[54] SECURITY COVER FOR AN AUTOMOBILE STORAGE COMPARTMENT

[75] Inventor: Donald E. Berkemeier, Bloomfield Hills, Mich.

[73] Assignee: LOF Plastics Inc., Troy, Mich.

[21] Appl. No.: 426,934

[22] Filed: Sep. 29, 1982

[51] Int. Cl.³ .............................. B60R 5/04; F06B 9/08
[52] U.S. Cl. ............................... 160/121 C; 296/37.16
[58] Field of Search ................... 160/121; 121 C, 122, 160/242–245, 323 R, 323 C, 325; 296/1 R, 37.16; 160/274, 275, 276, 290 R; 296/37.16

[56] References Cited

U.S. PATENT DOCUMENTS

| | | | |
|---|---|---|---|
| 235,811 | 12/1880 | Pullinger | 160/121 C |
| 281,128 | 6/1883 | Paulding | 160/275 X |
| 669,321 | 3/1901 | Holwager et al. | 160/121 |
| 1,003,045 | 9/1911 | Hartsough | 160/121 C |
| 1,764,310 | 6/1930 | Hoyt | 160/275 |
| 1,950,927 | 3/1934 | McMillan | 296/1 R |
| 3,911,992 | 12/1975 | Webb | 160/290 R |
| 4,222,601 | 9/1980 | White et al. | 160/306 |

Primary Examiner—Peter M. Caun
Assistant Examiner—Cherney S. Lieberman
Attorney, Agent, or Firm—Phillip S. Oberlin

[57] ABSTRACT

The present invention relates to a security cover for an automobile storage compartment. The security cover includes a pair of longitudinally extending track members disposed along opposite sides and between opposite ends of the compartment to be covered. An elongated roller member extends between the track members. Means associated with the ends of the roller member effect a sliding engagement with a respective one of the track members. Flexible sheet material of generally rectangular outline is provided, such sheet material having a width substantially coextensive with the width of the compartment to be covered. Means are provided for connecting the sheet material to the roller member intermediate the opposite ends of the sheet material. A spring means causes rotation of the roller member to effect a rolling of the sheet material concentrically about the roller member. Means are provided for selectively maintaining the opposite ends of the sheet material near the opposite ends of the compartment.

3 Claims, 11 Drawing Figures

SECURITY COVER FOR AN AUTOMOBILE STORAGE COMPARTMENT

BACKGROUND OF THE INVENTION

1. Field of the Invention

Design of automotive vehicles has resulted in the provision of storage compartments which are located immediately forward of the rear access doors of station wagons and the hatch of hatch-back model vehicles. Such designs have resulted from the ever-increasing demand for smaller, more fuel efficient means of transportation.

While the designs have achieved many of the objectives sought by the automotive designers, a problem has arisen involving the fact that goods stored in the storage compartment, such as tools, cameras, and other valuables, are exposed to the eyes of passersby. In view of the high visibility, there is an increased risk of vandalism and resultant theft of property in automobiles of this design.

Accordingly, attempts have been made toward providing a suitable covering over the storage compartment containing the valuables therein. These covers have proven to be successful in diminishing the amount of vandalism and theft. However, with the previous covering structures, access to the compartment from the interior of the vehicle has been difficult at best.

2. Description of the Prior Art

A typical rear compartment cover structure is illustrated and described in U.S. Pat. No. 4,139,231 to Lang et al. The Lang et al. cover includes an elongate hollow cylindrical roller about which is rolled a flexible sheet member. The roller is spring-loaded to effecitvely roll the flexible member thereon when access to the interior of the covered compartment is desired. Typically, the roller is fixed to roll about an access point adjacent to the rear sheet of the associated vehicle. The free end of the flexible member is hooked to the hatch door of the vehicle, for example, when in the covered position. When access to the covered compartment is desired, the free end is manually unlatched from the rear of the compartment, allowing the roller member to roll the entire length of the flexible member thereabout to completely expose the entire compartment.

Manifestly, the Lang et al. cover achieves the objective of covering the compartment and permits access thereto from the rear of the vehicle. However, access to the compartment from the interior of the vehicle, while the vehicle is in motion, for example, is nearly impossible. Other storage compartment covers and related structures are illustrated in U.S. Pat. Nos. 704,738 to Edwards, 1,950,927 to McMillan, 3,909,060 to Katayama, 4,009,745 to Erpenbeck, 4,127,301 to Syrowik, and 4,222,601 to White et al.

There are other rear compartment cover structures wherein access is effected from the forward portion of the compartment. However, such structures do not permit access to the compartment from the rear.

SUMMARY OF THE INVENTION

The present invention relates to a security cover for an automobile storage compartment wherein access to the interior of the compartment may be had from either the front or rear thereof. The security cover of the invention typically includes a pair of longitudinally-extending track members disposed along opposite sides and between opposite ends of the compartments to be covered. An elongate roller member extends between the track members. Means associated with the ends of the roller members effect a sliding engagement with a respective one of the track members. A pair of sheets are provided of substantially rectangular flexible material and having a width coextensive with the width of the compartment to be covered. Each of the sheets has a leading and trailing edge. Means are provided for connecting the trailing edges of each of the sheets to the roller member. A spring means causes rotation of the roller member to effect a rolling of the sheets concentrically about the roller member. Means are provided for selectively maintaining the leading edges of the two sheets near the opposite ends of the compartment.

It is an object of the present invention to provide an improved security cover for an automobile storage compartment.

It is another object of the present invention to provide such a cover wherein access to the storage compartment may be achieved from either the front or rear thereof.

Another object of the invention is to produce a security cover for an automotive vehicle wherein the inherent structure militates against sagging of the covering sheet material regardless of the span.

Other objects and advantages of the present invention will become apparent to those skilled in the art from the following detailed description of the preferred embodiment, when considered in light of the accompanying drawings.

DETAILED DESCRIPTION OF THE PREFERRED EMBODIMENT

Figure 1:
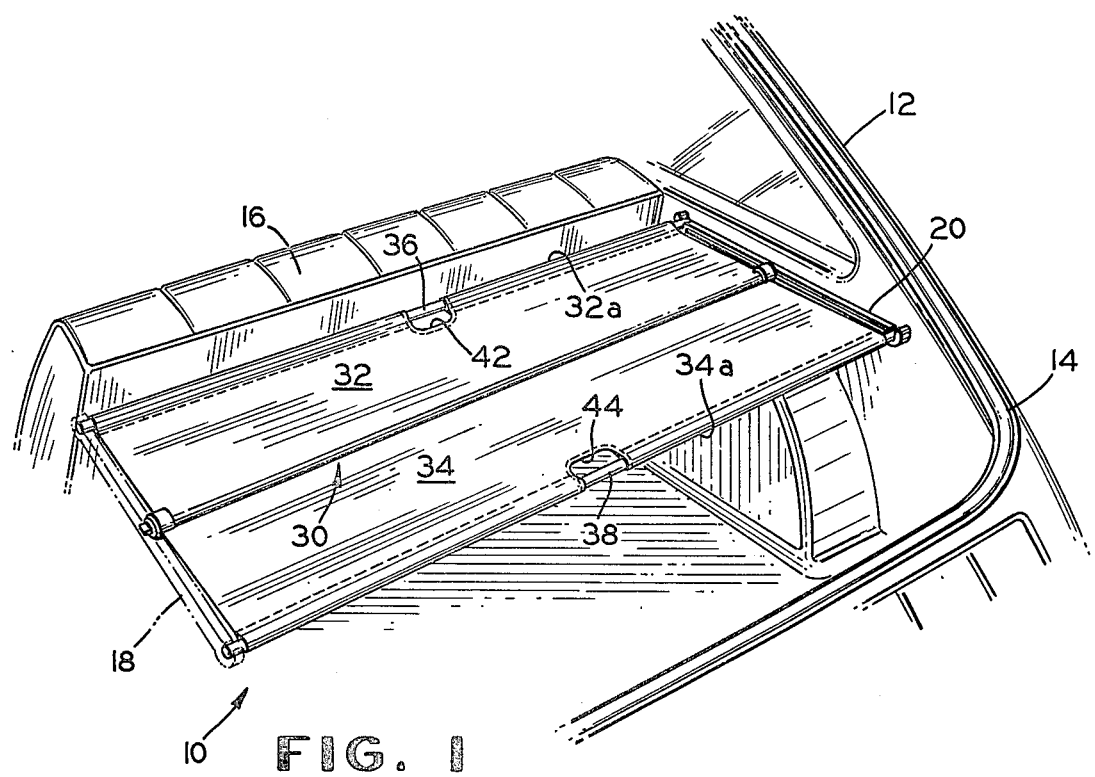
FIG. 1 is a fragmentary perspective view of a security cover embodying the features of the present invention in an associated vehicle.
Figure 2:
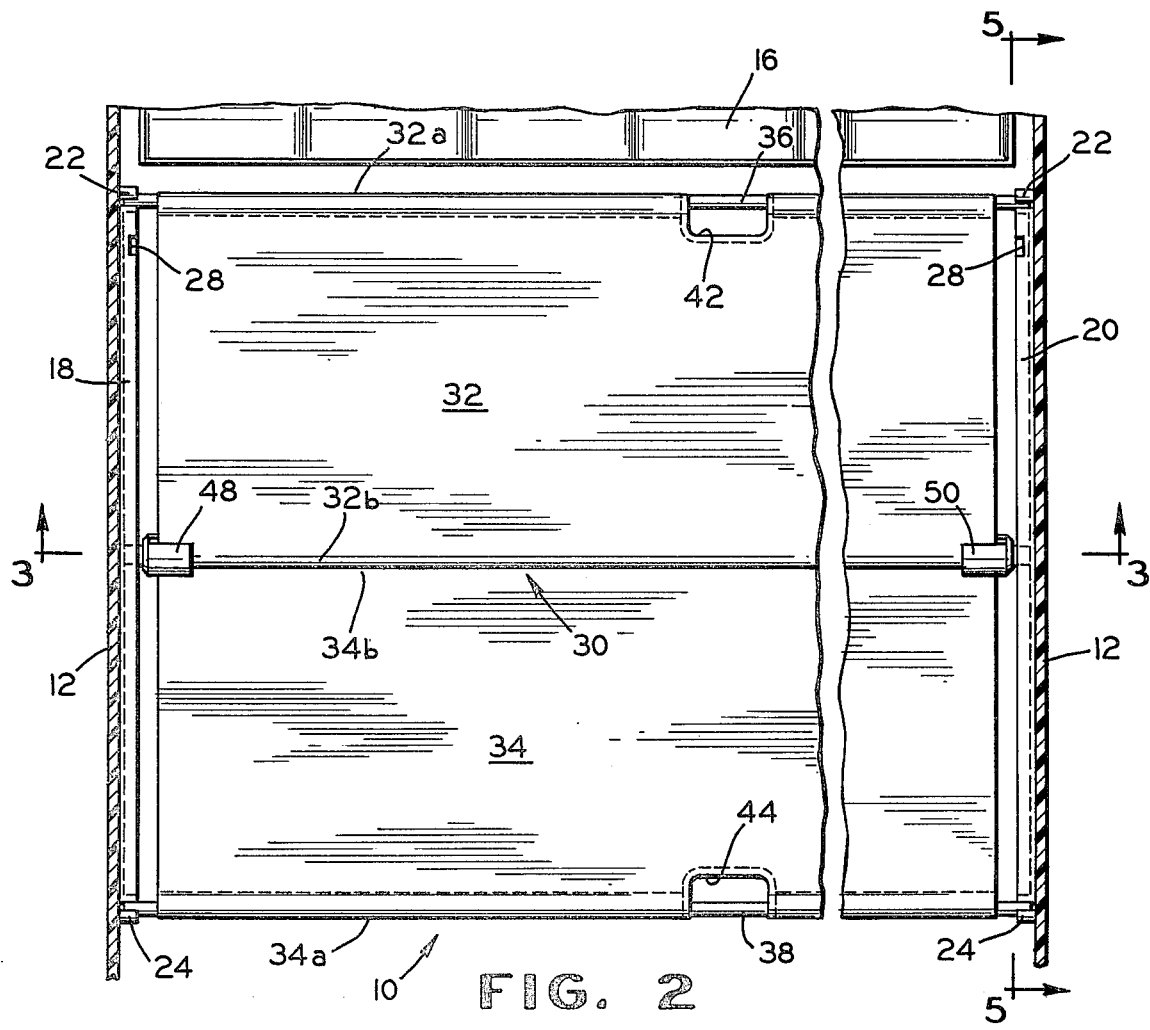
FIG. 2 is a fragmentary top plan view of the structure illustrated in FIG. 1.

Referring now to the drawings, there is illustrated in FIGS. 1 and 2 an improved security cover structure 10 for the storage compartment of a hatch-back automobile 12 or other vechicle. Although the security cover 10 is described and illustrated as extending between a hatch door 14 and a rear bench seat 16 of the hatch-back automobile 12, it will be apreciated that the present invention can be utilized to cover any open-ended storage compartment in which easy access is desired from either end of the compartment.

Figure 3:
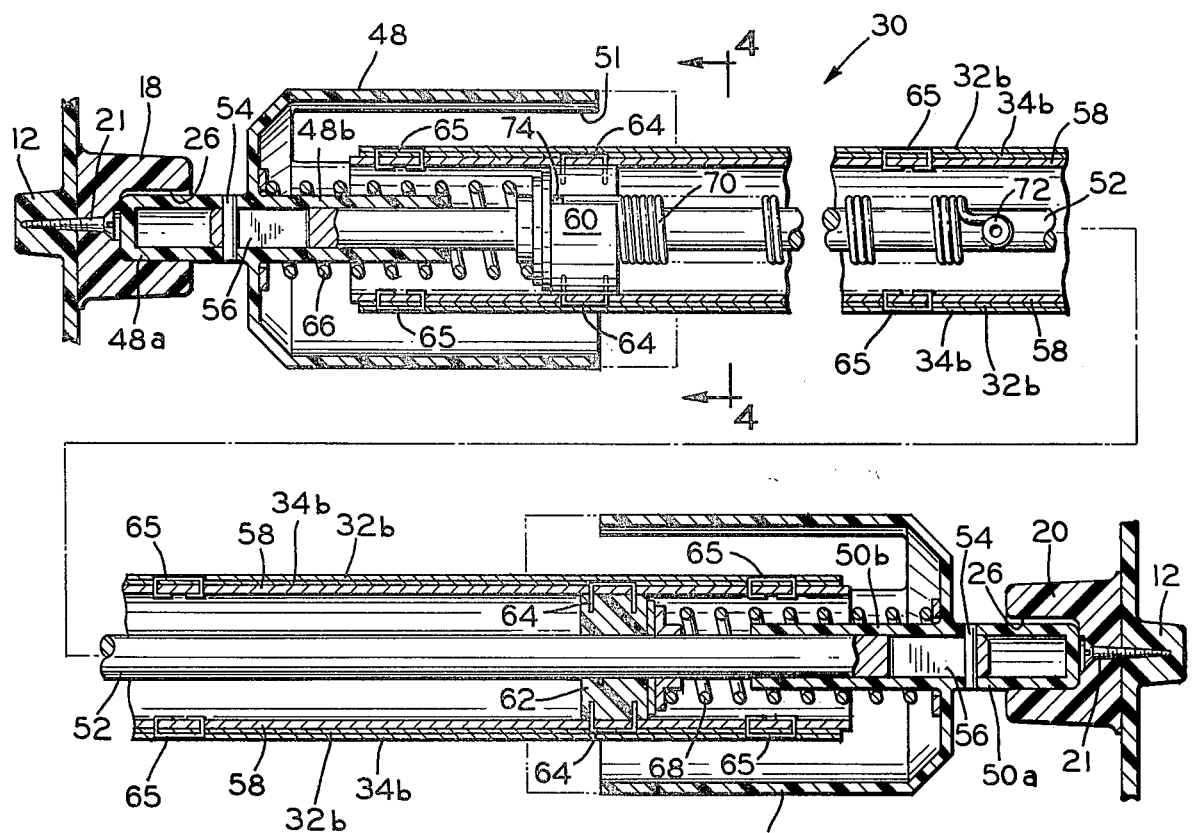
FIG. 3 is a sectional view of the invention taken along line 3—3 of FIG. 2.
Figure 4:
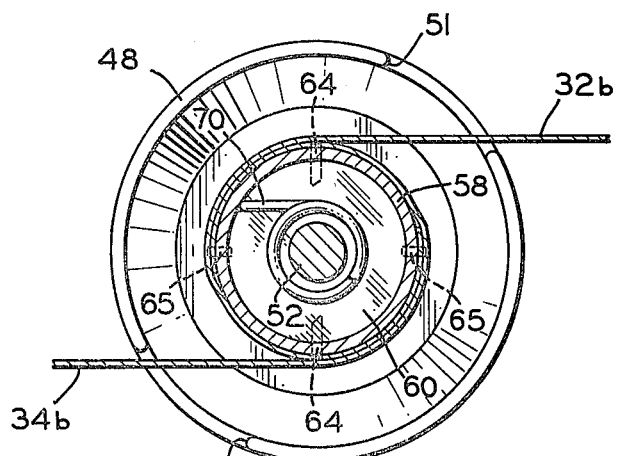
FIG. 4 is a sectional view of the structure illustrated in FIG. 3 taken along line 4—4 thereof.
Figure 5:
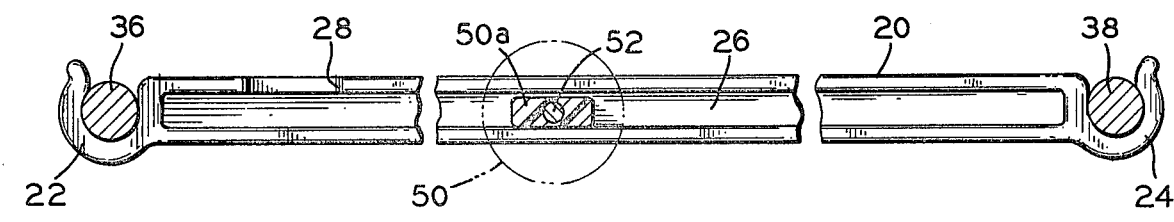
FIG. 5 is a sectional veiw of a track member of the structure illustrated in FIG. 2 taken along line 5—5 thereof.

A pair of similar longitudinally extending track members 18 and 20 is disposed along opposite sides of the storage compartment to be covered. The track members 18 and 20 can be secured to the sides of the automobile 12 by a plurality of conventional threaded fasteners 21, as shown in FIG. 3. FIG. 5 most clearly illustrates the construction of the track member 20. As shown therein, the track member 20 terminates at each end in a hooked portion 22 and 24. A longitudinally extending recess 26 is formed substantially throughout the track member 20 between the hooked end portions 22 and 24. A slot 28 is formed in the upper side of the track member 20 near the one hooked end portion 22 thereof.

The security cover includes an elongate roller member 30 which extends between the track members 22 and 24. A pair of sheets 32 and 34 of substantially rectangular flexible material is provided, each having a width coextensive with the width of the compartment to be covered. Each of the sheets 32 and 34 has a leading edge 32a and 34a, respectively, and a trailing edge 32b and 34b, respectively. The leading edges 32a and 34a are provided with suitable pockets for receiving respective end rods 36 and 38 and secured to the sheets 32 and 34, resepctively, by appropriate stitching or other means such that the end rods 36 and 38 are retained therein. Cut-away portions 42 and 44 may be provided in the flexible sheets 32 and 34, respectively, to facilitate grasping of the rods 36 and 38 for easy manipulation. As shown in FIG. 2, the rods 36 and 38 extend across the entire width of the storage compartment into engagement with the hooked end portions 22 and 24 of the associated cooperating track members 18 and 20. It will be readily apparent that there are other methods of terminating the fabric. Molded plastic handle structures could satisfactorily be employed. Suffice it to say that any structure will function provided it is sufficiently stiff or sturdy to allow the fabric to be pulled uniformly from its associated roller.

FIG. 3 illustrates the construction of the roller member 30. The ends of the roller member 30 are provided with respective end caps 48 and 50. Appropriate slots 51 are formed in each of the end caps 48 and 50 to permit the flexible sheets 32 and 34 to pass therethrough unhindered. Each of the end caps 48 and 50 includes an integral outwardly extending tongue portion 48a and 50a, respectively. The tongues 48a and 50a extend into the longitudinal recesses 26 formed in the respective track members 18 and 20 for effecting a sliding engagement therewith. Each of the end caps 48 and 50 includes an integral inwardly extending hollow cylindrical extension 48b and 50b, respectively. A shaft 52 is secured at each end within one of the hollow cylindrical extensions 48b and 50b and retained therein by a pin 54 extending through a slot 56 formed in each end of the shaft 52. Hence, it can be seen that relative rotational movement between the axle rod 52 and the end caps 48 and 50 is prevented, while limited axial movement therebetween is permitted. The same functional relationship of the end caps 48 and 50, and the associated axle 52 may be achieved by forming a slot in the end caps and a hole in the shaft for receiving a retaining pin.

A cylindrical tube 58 is rotatably supported concentrically about the shaft 52 by spaced annular bearing members 60 and 62. The cylindrical tube 58 is secured to the bearing members 60 and 62 by any conventional means, such as by a plurality of staples 64. The bearing members 60 and 62 are typically formed of a plastic material which will readily provide for relative rotational movement of the cylindrical tube 58 and the associated bearing members 60 and 62 about the shaft 52. The trailing edges 32b and 34b of the flexible sheets 32 and 34, respectively, are attached to the outer wall of the cylindrical tube preferably by a plurality of staples 65.

Helical spring elements 66 and 68 are disposed concentrically about the cylindrical extensions 48b and 50b, respectively, and disposed between the bearings 60 and 62, respectively, and the inner walls of the end caps 48 and 50, respectively. The springs 66 and 68 normally urge the respective tongue portions 48a and 50a of the end caps 48 and 50 outwardly into the longitudinal recesses 26 formed in the track members 18 and 20. The urging of the springs 66 and 68 against the end caps 48 and 50 prevents the roller member 30 from vibrating or rattling within the track members 18 and 20 when the vehicle 12 is in motion. Also, the structure permits the assemblage to accommodate width tolerances in each individual vehicle and to adjust to design width differences between the front and rear of the vehicle in the instances where the front of the compartment is a different width than the rear of the compartment. If desired, the end caps 48 and 50 can be urged inwardly against the bias of the respective springs 66 and 68 to disengage the tongue portions 48a and 50a from the recesses 26 formed in the track members 18 and 20 to permit removal of the roller member 30 from the security cover assembly 10. Removal may also be achieved by canting the assemblage relative to the associated track sections to a degree sufficient to effect the desired disengagement.

A spring 70 is provided to cause rotation of the cylindrical tube 58 about the axis of the shaft 52 to effect a rolling of the flexible sheets 32 and 34 concentrically about the tube 58. The spring 70 is attached at one end to the shaft 52 by a pin 72 and secured at the other end within a recessed slot 74 formed in the bearing 60. The spring 70 is typically pretensioned during the assembly process to a degree sufficient to provide the necessary torque to effect a rolling of the fabric.

In operation, the flexible sheets 32 and 34 are extended to the position illustrated in FIGS. 1 and 2 and maintained in such position by disposing the end rods 36 and 38 within the respective hooked end portions 22 and 24 of the track members 18 and 20, respectively. To gain access to the covered security compartment from the end near the rear seat 16, for example, the end rod 36 is grasped in the cut-away portion 42 of the flexible sheet 32 and pulled upwardly out of engagement with the hooked end portions 22 of the track members 18 and 20. The spring 70 causes the cylindrical tube 58 of the roller member 30 to rotate and thereby concentrically roll the flexible sheets 32 and 34 thereabout. As the sheets 32 and 34 are being rolled up, the tongue portions 48a and 50a allow the roller member 30 to slide through the recesses 26 formed in the track members 18 and 20 toward the other end rod 38. When it is desired to again cover the storage compartment, the end rod 36 is pulled toward the rear seat 16. The flexible sheets 32 and 34 are unrolled as the roller member 30 slides toward the center of the tack members 18 and 20 and simultaneously winds the helical spring 70.

It will be appreciated that access can be gained to the storage compartment from the opposite end thereof by simply releasing the other end rod 38 from the hooked end portions 24 of the track members 18 and 20. If it is desired to remove the entire security cover assembly 10, both end rods 36 and 38 can be released and the roller member 30, having both of the flexible sheets 32 and 34 wrapped completely thereabout, can be lifted upwardly through the slot 28 and out of engagement with the track members 18 and 20. And, as earlier mentioned, the assemblage can be canted with respect to the associated track members 18 and 20 and amount sufficient to cause disengagement.

Figure 6:
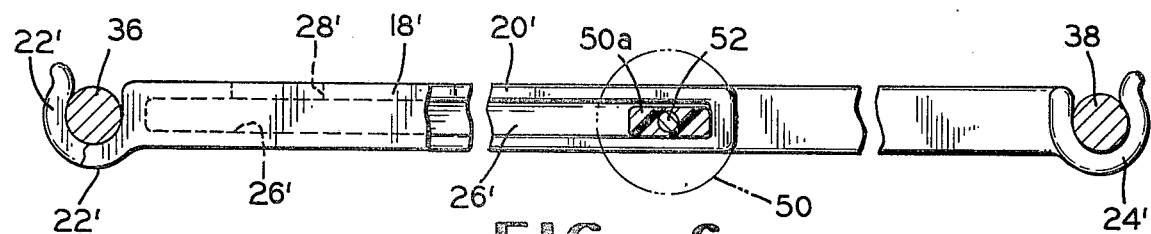
FIG. 6 is a view of another embodiment of the track member illustrated in FIG. 5 and including a portion of the opposed track member of this embodiment.

An alternate embodiment of the present invention is illustrated in FIG. 6. The track member 20' has a longitudinal recess 26' formed therein which extends only half the length of the track member 20'. The other or opposed track member 18' is similarly formed. When the end rod 36 is raised out of engagement with the hooked end portions 22' of the track members 18' and 20', the flexible sheets 32 and 34 will not be rolled about the cylindrical tube 58 because the roller member 30 is prevented from sliding towards the other end rod 38. Hence, the flexible sheet 32 attached to the end rod 36 can simply be laid back over the other flexible sheet 34 unit it is returned to the position illustrated in FIG. 1. However, the invention will function as described above in FIG. 5 if the other end rod 38 is raised out of engagement with the hooked end portions 24' and released. The flexible sheets 32 and 34 will be rolled about the roller member 30 as it slides through the track members 18' and 20' toward the end rod 36. Such an alternate embodiment may be desirable when access to the security compartment will normally be desired from one end thereof.

It should be noted that the embodiment illustrated in FIG. 6, the track member 20', may be shortened by eliminating the section thereof which extends between the central portions and the hook 24'. In such an embodiment, the hooks 24' would be separately mounted or attached to the sides of the vehicle. By providing separate hooks attached to the sides of the vehicle, the free end of the flexible material 34 can be secured without the track extension. Obviously, such a structure would be cost efficient.

Figure 7:
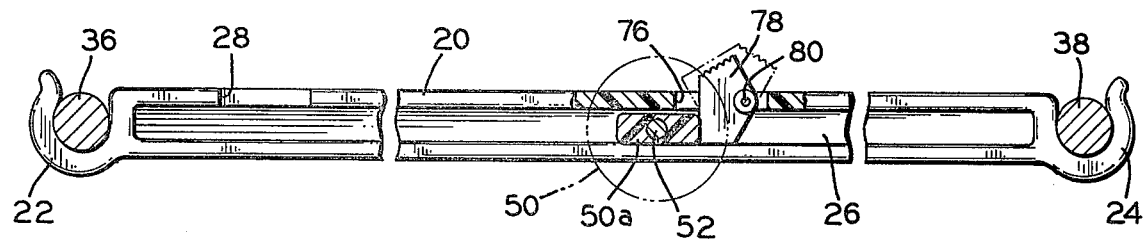
FIG. 7 is a sectional view of an embodiment of the track member illustrated in FIG. 6 illustrating a pivotally mounted stop member.
Figure 8:
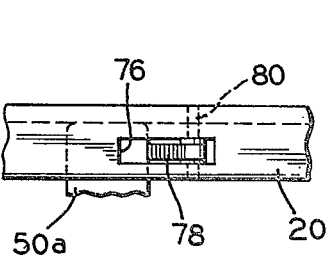
FIG. 8 is a fragmentary top plan view of the structure illustrated in FIG. 7.

A further embodiment of the present invention is illustrated in FIGS. 7 and 8. The track member 20 shown therein is identical to that descirbed in FIG. 5 with the exception that a narrow slot 76 is formed in the upper edge thereof. A stop member 78 is pivotally secured therein by a pin 80. When the stop member 78 is pivoted downwardly into the recess 26, as shown in FIGS. 7 and 8, the roller member 30 is prevented from sliding therepast toward the end rod 38. Thus, the invention operates in the manner described for the alternate embodiment of FIG. 6. When the stop member 78 is pivoted upwardly out of the recess 26, as illustrated by the phantom lines in FIG. 7 the invention operates in the manner described in the preferred embodiment illustrated in FIG. 5.

Figure 9:
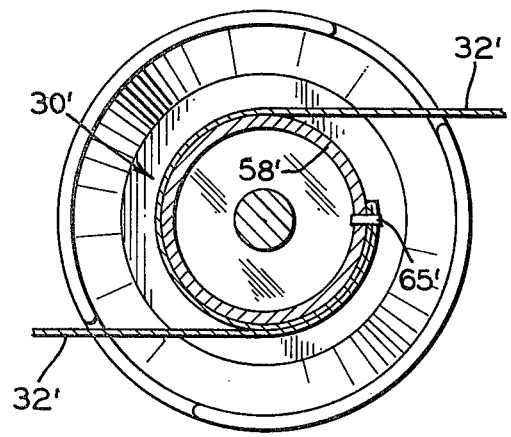
FIG. 9 is a sectional view, similar to FIG. 4. showing another embodiment of the invention wherein a single length of flexible sheet material is employed, rather than the separate sheets illustrated in the preferred embodiment.

FIG. 9 illustrates another embodiment of the invention wherein a single length of flexible sheet material 32' is employed, rather than the individual sheets 32 and 34 as employed in the embodiment illustrated in FIGS. 1, 2, 3 and 4. The roller member 30' is secured to the central portion of the flexible sheet material 32' by staples 65', for example, which are typically adapted to extend through the material and into the associated cylindrical tube 58' of the roller 30'. It will be noted that the material 32' is folded upon itself at the region of attachment to the roller member 30'. In all other respects the assemblage functions in a manner similar to that explained hereinabove.

Figure 10:
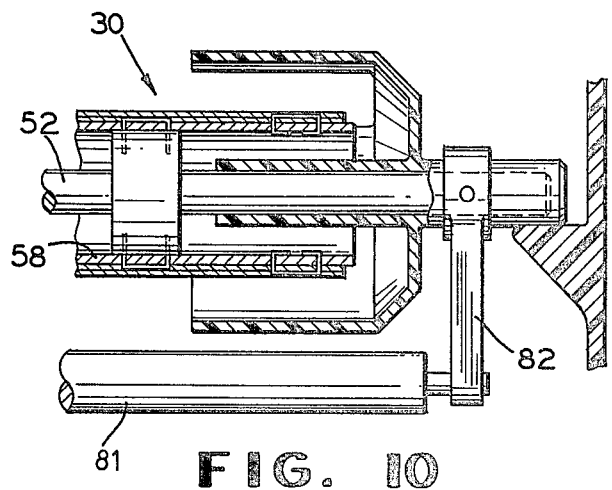
FIG. 10 is a fragmentary view partly in section to clearly illustrate the structure showing another embodiment of the invention useful in eliminating the sagging of the associated covering material.
Figure 11:
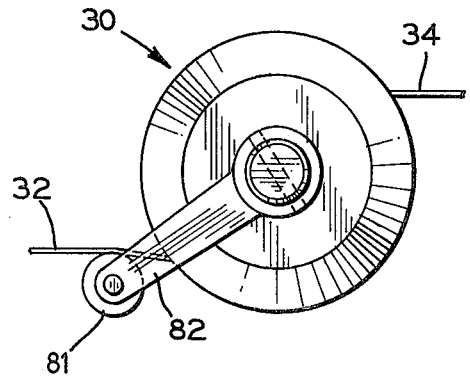
FIG. 11 is an end view of the structure illustrated in FIG. 10.

FIGS. 10 and 11 illustrate another embodiment of the invention wherein the cover assemblage includes a means to initiate against any sagging of the covering material. In certain embodiments of the invention where the assemblage did not employ the track members of the type utilized in the embodiment illustrated in FIGS. 1, 2, 3 and 4, any sagging of the covering material 32 and 34 can be substantially avoided by employing a tensioning roller 81 secured to an extension of the shaft 52 of the roller member 30 and the spaced support arm 82. The support arms 82 and the associated tensioning roller 81 are spring biased in a direction opposite to that of the cylindrical 58 such that the tensioning roller 81 constantly functions to take up any tendency of the sheet material to sag.

In accordance with the provisions of the patent statutes, the principle and mode of operation of the present invention have been explained and illustrated in its preferred embodiment. However, it must be appreciated that the present invention can be practiced otherwise than as specifically explained and illustrated without departing from its spirit or scope.

I claim:

1. A security cover for use in covering a storage compartment comprising:
    a pair of longitudinally extending track members disposed along opposite sides and between opposite ends of the compartment to be covered, each of said track members including hooked end portions and a longitudinally-extending recess extending therebetween;
    an elongate roller member extending between said track members;
    means associated with each end of said roller member for effecting a sliding engagement throughout the length of the recess of each said track member, said means including an end cap having an outwardly extending tongue portion, said tongue portions being received in the recesses of said track member for sliding engagement therewith;
    flexible sheet material of a size to cover the compartments;
    means for connecting said roller member to said sheet material intemediate opposite ends thereof;
    means for selectively maintaining the opposite ends of said sheet material near respective opposite ends of the compartment to cover the compartment, said means comprising an end rod attached to each opposite end of said sheet material, the end portions of said end rods being selectively receivable in the respective hooked end portions of said support members;
    and means for urging rotation of said roller member to effect a rolling of said sheets concentrically about said roller member and sliding movement along said track members when said end rod of one of the opposite ends of said sheet material is released from the respective hooked end portions of said track members, whereby said sheet material is wound about said roller to uncover the storage compartment when either opposite ends of said sheet material is released.

2. The invention of claim 1 including stop means disposed at the mid-portion of each of said track members for selectively extendinng into the recesses thereof for preventing said roller member from sliding therepast when one of said end rods is released whereby said sheet material is wound about said roller to uncover the storage compartment when said one end rod is released.

3. The invention of claim 2 wherein said stop means comprises an abutment member pivotally mounted at the mid-portion between the hooked end portions of said track members for selectively projecting into the longitudinally-extending recesses of said track members.

* * * * *